US011603120B2

(12) United States Patent
Kwak (10) Patent No.: US 11,603,120 B2
(45) Date of Patent: Mar. 14, 2023

(54) AUTONOMOUS DRIVING CO-DRIVER SWITCH MODE CERTIFICATION SYSTEM AND METHOD OF ITS OPERATION IN A COMMERCIAL VEHICLE ELD

(71) Applicant: TrueLite Trace, Inc., San Jose, CA (US)

(72) Inventor: Sung Bok Kwak, San Jose, CA (US)

(73) Assignee: Truelite Trace, Inc., San Jose, CA (US)

( * ) Notice: Subject to any disclaimer, the term of this patent is extended or adjusted under 35 U.S.C. 154(b) by 275 days.

(21) Appl. No.: 16/907,295

(22) Filed: Jun. 21, 2020

(65) Prior Publication Data

US 2021/0394800 A1 Dec. 23, 2021

(51) Int. Cl.
*B60W 60/00* (2020.01)
*B60W 40/09* (2012.01)
*G07C 5/08* (2006.01)
*B60W 40/08* (2012.01)

(52) U.S. Cl.
CPC ........ *B60W 60/0059* (2020.02); *B60W 40/09* (2013.01); *B60W 60/001* (2020.02); *G07C 5/0808* (2013.01); *B60W 2040/0809* (2013.01)

(58) Field of Classification Search
CPC ............. B60W 60/0059; B60W 40/09; B60W 60/001; B60W 2040/0809; G07C 5/0808; G07C 5/0841; G07C 5/008; G06Q 10/0639
See application file for complete search history.

(56) References Cited

U.S. PATENT DOCUMENTS

| 2017/0234689 A1* | 8/2017 | Gibson ................. B60W 50/14 701/25 |
| 2017/0364070 A1* | 12/2017 | Oba ..................... B60K 28/066 |
| 2018/0293590 A1* | 10/2018 | Harter .................. G06Q 30/018 |
| 2018/0340790 A1* | 11/2018 | Kislovskiy ......... G01C 21/3484 |
| 2019/0026962 A1* | 1/2019 | Gintz ..................... G07C 5/008 |
| 2019/0184997 A1* | 6/2019 | Zheng .................. B60W 40/09 |
| 2019/0225145 A1* | 7/2019 | Sippl ..................... B60W 30/10 |

(Continued)

*Primary Examiner* — Peter D Nolan
*Assistant Examiner* — Peter Y Ning
(74) *Attorney, Agent, or Firm* — Invent Capture, LLC.; Samuel S. Cho (57) ABSTRACT

A novel autonomous driving co-driver switch mode certification system securely determines and certifies an autonomous machine driving mode, which is activated in a permitted route under conditions approved by a regulatory agency. The autonomous driving co-driver switch mode, when enabled, allows a commercial vehicle driver to utilize the vehicle's autonomous driving capability as long as the commercial vehicle driver and the vehicle are also meeting the regulatory agency-defined safety and regulatory requirements before and during the autonomous machine driving mode. The autonomous driving co-driver switch mode is deemed trustworthy and certified by the regulatory agency, if the vehicle's ECU, ELD, and sensory readouts confirm a tamperproof validation of the agency-approvable state of the commercial vehicle driver and the vehicle. The novel autonomous driving co-driver switch mode certification system improves the public trustworthiness of autonomous driving modes intended to increase fleet productivity, fuel efficiency, and safety in commercial vehicles.

12 Claims, 5 Drawing Sheets

A Commercial Fleet-Level Autonomous Driving Management System Block Diagram Incorporating an Autonomous Driving Co-Driver Switch Mode Certification System

200

(56) References Cited

U.S. PATENT DOCUMENTS

| | | | |
|---|---|---|---|
| 2019/0295333 A1* | 9/2019 | Nista .................... | G07C 5/0825 |
| 2020/0139992 A1* | 5/2020 | Oba ...................... | B60W 10/20 |
| 2020/0294401 A1* | 9/2020 | Kerecsen ............. | G05D 1/0287 |
| 2020/0307610 A1* | 10/2020 | Lerner .................. | G07C 5/008 |

\* cited by examiner

A Holistic Multi-Component Relationship Diagram for an Autonomous Driving Co-Driver Switch Mode Certification System

A Commercial Fleet-Level Autonomous Driving Management System Block Diagram Incorporating an Autonomous Driving Co-Driver Switch Mode Certification System

An Embodiment of a Vehicle Sensor Readout-Based Tamperproof "Co-Driver" Switch Mode Certification Module

An Operational Flowchart for an Autonomous Driving Co-Driver Switch Mode Certification System

FIG. 5

AUTONOMOUS DRIVING CO-DRIVER SWITCH MODE CERTIFICATION SYSTEM AND METHOD OF ITS OPERATION IN A COMMERCIAL VEHICLE ELD

BACKGROUND OF THE INVENTION

The present invention generally relates to one or more electronic systems for commercial driver responsibility determinations, recordkeeping, and analysis during autonomous machine-driving modes in commercial vehicles. More specifically, various embodiments of the present invention relate to systems and methods for an objective and tamperproof machine determination and certification of an autonomous driving co-driver switch mode activation or deactivation for a commercial vehicle equipped with an electronic logging device (ELD). Furthermore, various embodiments of the present invention also relate to validating autonomous driving co-driver switch mode certifications for commercial vehicles and deriving novel quantitative metrics to measure the safety of particular commercial vehicles engaged in novel "co-driver" switch modes during autonomous machine driving of commercial vehicles.

Autonomous machine driving, which is also called interchangeably as "autonomous driving" for one of ordinary skill in the art, has evolved from conceptual imaginations to real-life implementations for cars, trucks, and other automobiles in recent years. Although most "autonomous machine driving" solutions in the automotive market today are typically semi-autonomous driver assistance tools, such as smart cruise controls with automatic steering activated on a pre-programmed route (e.g. interstate freeways or other wide open roads with minimal pedestrian or cross-traffic complexities), some autonomous machine driving offerings, such as "Level 4 or Level 5 Autonomy" solutions, aspire to be fully autonomous, with little to no requirements to the driver to hold the steering wheel and intervene on braking and acceleration for an extended period.

Typically, autonomous machine driving involves various vehicle self-driving sensors (e.g. Lidars, radars, cameras, ultrasound, global positioning systems (GPS), etc.) connected to a self-driving navigation control module and a vehicle dynamics control interface to enable a vehicle to steer, accelerate, brake, or cruise on public roads with minimal driver interventions. For commercial vehicle fleet operations involving extensive utilization of trucks, vans, and/or buses to transport cargo or passengers, an optimized integration of autonomous machine driving modes to commercial vehicles may reduce the commercial drivers' fatigue, while improving both safety and efficiency of the commercial vehicle operations.

However, commercial vehicle operations and commercial vehicle drivers are regulated and legally mandated by state, federal, national, and/or municipal governments to record and submit proof of commercial vehicle operating history, driver resting period compliance, vehicle condition inspections, and vehicle maintenance compliance in an effort to enhance public roads safety. For example, in the United States, a commercial vehicle driver is obligated by various regulatory compliance measures to record and update his or her vehicle operating status and legally-mandated resting activities between vehicle operations. Failure to meet such regulatory requirements in vehicle operating logs may result in significant penalties imposed on commercial vehicle drivers and their employers.

In one example of regulatory requirements on a commercial vehicle driver, the driver is required to take a mandatory thirty-minute break after eight hours of consecutive driving or active on-duty tasks associated with the commercial vehicle (i.e. "30-minute required break per consecutive 8-hour drive"). The commercial vehicle driver may also be required to abide by other mandatory rest requirements, such as a consecutive rest period of thirty-four hours for every non-consecutive sixty hours of active on-duty driving per week (i.e. "60-hour cycle limit"), or a consecutive rest period of ten hours, including eight hours of sleep, for every non-consecutive eleven hours of active on-duty driving (i.e. "11-hour driving limit"). A regulatory violation intentionally or inadvertently caused by a commercial vehicle driver may result in stiff penalties or fines to the commercial vehicle driver and a related vehicle fleet operator.

Importantly, any attempts to integrate autonomous machine driving in the highly-regulated commercial vehicle operations may require a specialized set of regulatory guidelines as well as transparent and tamperproof methods and devices to record, verify, and/or approve engagement to or disengagement from the autonomous machine driving mode. Furthermore, commercial driver rest requirements may be set more leniently or flexibly, compared to conventional regulations designed for the sole human driving of commercial vehicles, because the autonomous machine driving may significantly reduce driver fatigue while improving the overall safety on public roads.

Therefore, it may be desirable to devise a novel electronic system for a commercial vehicle that securely determines and certifies an autonomous machine driving mode activated in a particular route under conditions approved by a regulatory agency.

Furthermore, it may be desirable to ensure that this novel electronic system is objectively deemed trustworthy and tamperproof by incorporating real-time machine readout evidence from vehicle sensors, engine control unit (ECU) outputs, and/or electronic logging devices (ELDs).

In addition, it may also be desirable to devise a method for operating the novel electronic system for a commercial vehicle that securely determines and certifies an autonomous machine driving mode activated in a particular route under conditions approved by a regulatory agency.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an autonomous driving co-driver switch mode certification system is disclosed. This system comprises: a vehicle electronic logging device (ELD) connected to a vehicle on-board diagnostics (OBD) device, in-vehicle sensors, and an engine control unit (ECU), wherein the vehicle ELD contains a CPU, a memory unit, and input and output interfaces; a vehicle sensor readout-based tamperproof co-driver switch mode certification module inside or operatively connected to the vehicle ELD that determines authenticity, safety, and trustworthiness of a commercial vehicle and a vehicle driver to approve or reject the commercial vehicle's engagement into an autonomous driving co-driver switch mode, wherein the vehicle sensor readout-based tamperproof co-driver switch mode certification module intelligently evaluates driver resting period regulatory compliance, autonomous driving eligibility at the commercial vehicle's current position, recent driving behaviors in human driving modes, and identity of the vehicle driver from in-vehicle sensor readout values, OBD data streams, and driver-specific electronic log information to generate a regulatory compliance certificate or a certification rejection for a commercial vehicle safety regulatory agency; and an electronic log device (ELD) log entry and management module inside or operatively connected to the vehicle ELD, wherein the ELD log entry and management module generates the driver-specific electronic log information that contains a currently logged-in driver's on-duty, off-duty, and resting activities associated with the vehicle.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel autonomous driving co-driver switch mode certification systems and methods of operating thereof. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term herein referred to as "autonomous driving" is defined as fully or partially machine-controlled vehicle driving performed by artificial intelligence (AI) that proactively engages in vehicle driving decisions without requiring a human driver to control the vehicle's steering wheel and pedals directly during the machine-controlled vehicle driving. Examples of machine-controlled vehicle driving decisions include, but are not limited to, steering, braking, accelerating, navigating through a defined route, and avoiding obstacles (e.g. other vehicles, cross traffic, pedestrians, objects) that compromise vehicle safety, when an autonomous driving mode is activated in the vehicle. In a preferred embodiment of the invention, the artificial intelligence for autonomous driving is provided by one or more autonomous driving software and/or hardware modules, which are operatively connected to in-vehicle sensors (e.g. LIDAR, cameras, ultrasound sensors, radar sensors, GPS receivers, etc.), an engine control unit (ECU). Furthermore, some autonomous driving software and/or hardware modules may further be connected to a remotely-located computer server that provides adaptive neural network or machine learning from an accumulation of a macro dataset (i.e. a "big data") originating from a plurality of vehicles engaged in autonomous driving modes.

Furthermore, for the purpose of describing the invention, a term herein referred to as an "autonomous driving co-driver switch mode" is defined as a novel autonomous driving mode designed specifically for a commercial driver and a commercial vehicle, wherein the novel autonomous driving mode provides a comprehensive commercial trucking safety regulatory compliance with a regulatory agency, when the commercial driver of the commercial vehicle activates autonomous driving. In a preferred embodiment of the invention, the autonomous driving co-driver switch mode is typically only allowed to be engaged through a tamperproof certification process, which ensures that machine-controlled autonomous driving is only activated and/or active, when the commercial vehicle is traveling through a regulatory agency-approved route and when the commercial vehicle is physically supervised by a regulatory agency-approved commercial vehicle driver. The tamperproof certification process typically involves checking machine readout values from autonomous driving software and/or hardware modules, in-vehicle sensors, OBD device outputs, and ELD outputs to ensure that the commercial vehicle driver is only engaging in autonomous driving under a specific set of regulation-approved driving conditions and routes. Preferably, in order to activate and to remain in the autonomous driving co-driver switch mode, the commercial vehicle driver is also required to be awake and present in the driver's seat as a legally-responsible "co-driver" with over-riding privileges in the commercial vehicle during the machine-controlled autonomous driving. In the preferred embodiment of the invention, a successful and tamperproof electronic certification for the autonomous driving co-driver switch mode serves as a legal proof that the autonomous driving a commercial vehicle is currently engaged in is trustworthy and is fully compliant to pertinent commercial vehicle safety regulations.

In addition, a term herein referred to as a "vehicle on-board diagnostics (OBD) device" is defined as an electronic device installed in a vehicle to collect and/or analyze a variety of vehicle-related data. In one example, the vehicle OBD device outputs many data parameters in real-time, such as vehicle diagnostic information (e.g. engine temperature, oil level, OBD codes, and etc.), fuel consumption-related information, vehicle speed information, vehicle acceleration and deceleration information (i.e. measured in g-force or in SI units), ambient air temperature information, engine rotation-per-minute (RPM) information, vehicle location information, and other vehicle-related data. The OBD device is typically connected to an engine control unit (ECU) and a plurality of in-vehicle control or sensor components, such as an accelerometer, a speedometer, a thermostat, a barometer, an emissions control unit, a vehicle electronics control unit, and any other in-vehicle electronics components to check and diagnose the current condition of each connected vehicle component.

Output data parameters from the vehicle OBD device may be utilized as part of a certification process to record and/or approve a commercial driver's engagement of an autonomous driving co-driver switch mode. The real-time condition of the vehicle, as indicated by the vehicle OBD device outputs, may influence approval or rejection of a real-time certification of the autonomous driving co-driver switch mode. For example, if an autonomous driving co-driver switch mode certification system receives output streams from the vehicle OBD device that indicate mechanical problems with the vehicle or unsafe speed, acceleration, braking, or steering patterns by the commercial driver prior to an activation request or an activation of the autonomous driving co-driver switch mode, the autonomous driving co-driver switch mode may be denied of certification. In addition, the denied certification may be automatically reported to a commercial vehicle safety and regulatory agency in real time via a wireless transceiver installed in the commercial vehicle for regulatory compliance and/or violation alerts.

Furthermore, for the purpose of describing the invention, a term herein referred to as a "vehicle electronic logging device," or an "ELD," is defined as a specialized driver activity and autonomous driving log-generating electronic device connected to a vehicle OBD device. This specialized driver activity and autonomous driving log-generating electronic device analyzes real-time OBD output data parameters to objectively derive or confirm an ongoing driver activity, an autonomous driving co-driver switch mode, and/or vehicle repair needs in a commercial vehicle. For example, a vehicle ELD can objectively measure and confirm a "human-only" on-duty driving by tracking a nonzero vehicle speed data parameter, a deactivated status for the autonomous driving co-driver switch mode, and an engine "on" status signal from the vehicle OBD device, until the commercial vehicle driver stops and turns off the engine, or until the autonomous driving co-driver switch mode is activated.

In one example, the vehicle ELD incorporates or connects to a vehicle sensor readout-based "co-driver" switch mode certification module. In this configuration, the vehicle ELD can also assist the vehicle sensor readout-based co-driver switch mode certification module to be objective and tamperproof during a certification process by providing various data streams associated with the driver's recent driving behaviors (e.g. signs of driver aggressiveness, fatigue, speeding, etc.), vehicle operational conditions (e.g. signs of serious OBD error codes, powertrain problems, autonomous driving hardware or software module malfunctions, maintenance record issues, etc.), and the vehicle's real-time route to a list of autonomous driving-approved routes. The co-driver switch mode certification module can readily determine whether to certify or deny the activation of the autonomous driving co-driver switch mode.

In addition, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD and/or an autonomous driving co-driver switch mode certification system connected to an in-vehicle data transceiver unit, which further communicates with a remotely-located monitoring station. The required duration of the commercial vehicle driver's rest may be differentiated for human-only driving vs. autonomous driving with the driver merely taking a supervisory role as a "co-driver." For example, in the future, the regulatory requirement for commercial vehicle driver rest periods and intervals may be set more leniently by FMCSA (Federal Motor Carrier Safety Administration), NHTSA (National Highway Traffic Safety Administration), or by another regulatory agency, when and if the autonomous driving co-driver switch mode is engaged for an extensive period during the course of a commercial transit.

Moreover, for the purpose of describing the invention, a term herein referred to as "hour of service," or "HoS" is defined as a real-time, hourly, and/or minutely-managed and monitored commercial driving activity parameters and logs for commercial vehicle regulatory compliance required by state, municipal, and/or federal government agencies. For example, an autonomous driving co-driver switch mode certification system, implemented in accordance with a preferred embodiment of the present invention, may be integrated into an HoS-based ELD to provide a tamperproof "co-driver" switch mode certification module and a driver user interface, which in turn enable regulatory agency-trusted or agency-approved activation or deactivation of the autonomous driving co-driver switch mode in a commercial vehicle.

Furthermore, for the purpose of describing the invention, a term herein referred to as a "portable electronic device" is defined as a smart phone, a tablet computer, a notebook computer, a special-purpose proprietary ELD data controller device, or another transportable electronic device that can execute an autonomous driving co-driver switch mode certification for a commercial vehicle driver or a vehicle fleet operator to satisfy commercial vehicle safety regulatory requirements.

In addition, for the purpose of describing the invention, a term herein referred to as a "remote monitoring station unit" is defined as a vehicle fleet monitoring location for one or more commercial vehicles in operation. Examples of remote monitoring station units include, but are not limited to, a commercial vehicle operation control center, a regulatory traffic safety enforcement agency (e.g. FMCSA, NHTSA), a vehicle monitoring service center, and a fleet vehicle employer's information technology (IT) control center. Typically, the remote monitoring station unit is configured to execute and operate a commercial fleet-level multiple vehicle ELD log and database management system as well as an autonomous driving co-driver switch mode certification system in a computer server, a portable electronic device, another computerized device, or a combination thereof.

Moreover, for the purpose of describing the invention, a term herein referred to as "computer server" is defined as a physical computer system, another hardware device, a software module executed in an electronic device, or a combination thereof. Furthermore, in one embodiment of the invention, a computer server is connected to one or more data networks, such as a local area network (LAN), a wide area network (WAN), a cellular network, and the Internet.

Moreover, a computer server can be utilized by a vehicle monitoring personnel for gathering and analyzing electronically-generated commercial vehicle driver logs and autonomous driving co-driver switch mode certification records that are stored, updated, and modified by a commercial fleet-level multiple vehicle ELD log and database management system and an autonomous driving co-driver switch mode certification system.

One aspect of an embodiment of the present invention is providing a novel electronic system for a commercial vehicle that securely determines and certifies an autonomous machine driving mode activated in a particular route under conditions approved by a regulatory agency.

Another aspect of an embodiment of the present invention is ensuring that this novel electronic system is objectively deemed trustworthy and tamperproof by incorporating real-time machine readout evidence from vehicle sensors, engine control unit (ECU) outputs, and/or electronic logging devices (ELDs).

Yet another aspect of an embodiment of the present invention is providing a method for operating the novel electronic system for a commercial vehicle that securely determines and certifies an autonomous machine driving mode activated in a particular route under conditions approved by a regulatory agency.

Figure 1:
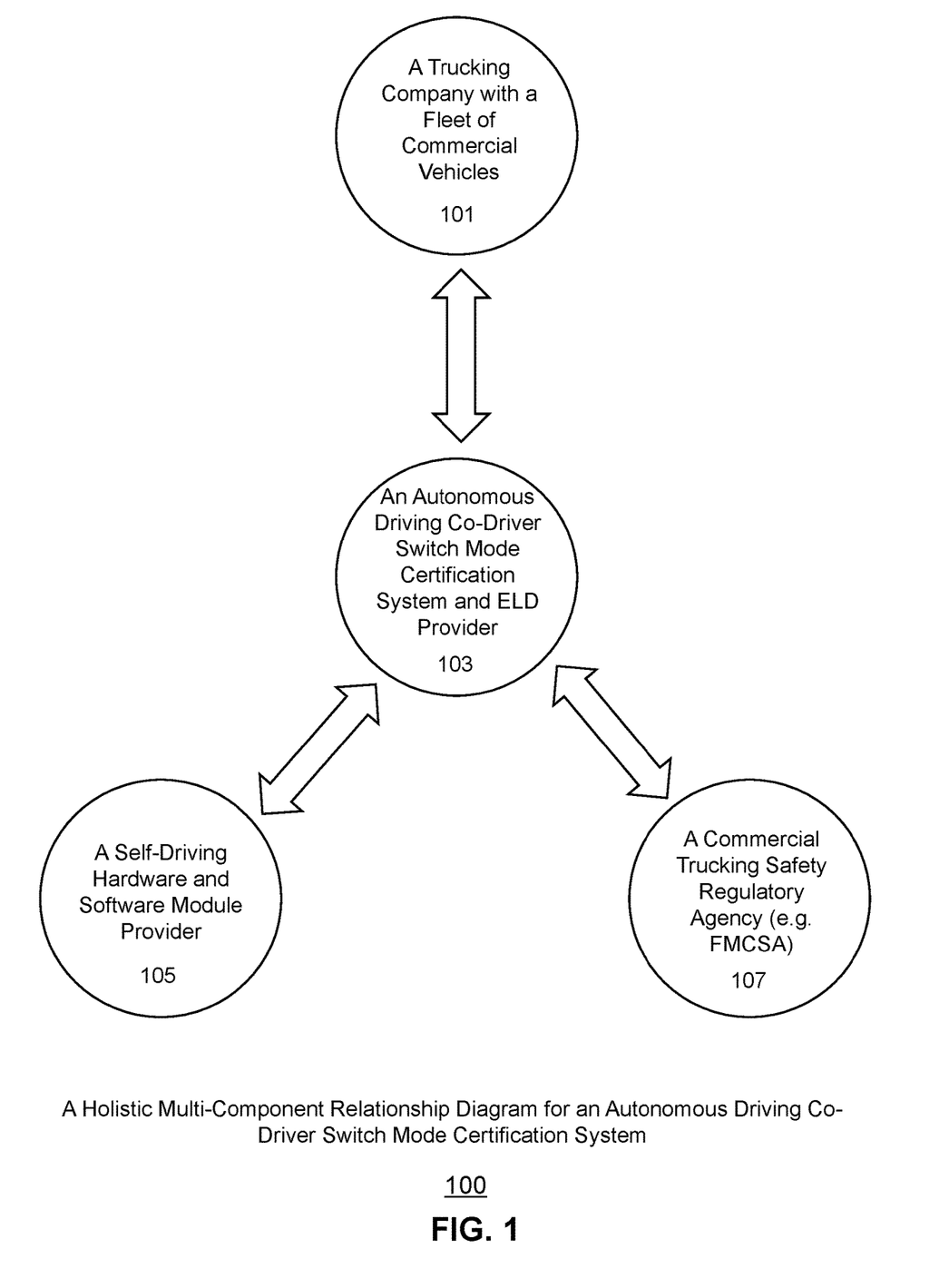
FIG. 1 shows a holistic multi-component relationship diagram for an autonomous driving co-driver switch mode certification system, in accordance with an embodiment of the invention.

FIG. 1 shows a holistic multi-component relationship diagram (100) for an autonomous driving co-driver switch mode certification system, in accordance with an embodiment of the invention. As shown in this diagram (100), the autonomous driving co-driver switch mode certification system, as disclosed in various embodiments of the present invention, involves four distinctive entities (101, 103, 105, 107) and underlying electronic infrastructures to support communication among the four distinctive entities. These four distinctive entities include, but are not limited to, a trucking company with a fleet of commercial vehicles (101), an autonomous driving co-driver switch mode certification system and electronic logging device (ELD) provider (103), a self-driving hardware and software module provider (105), and a commercial trucking safety regulatory agency (107), which may be FMCSA, NHTSA, or another federal or state regulatory agency.

In a preferred embodiment of the invention, the self-driving hardware and software module provider (105), such as Alphabet's Waymo or NVIDIA's autonomous driving platform, implements and integrates autonomous driving electronic components and operating software in the trucking company's fleet of commercial vehicles (101) and related data processing centers. For example, each commercial vehicle may be equipped with LIDAR sensors, radar components, ultrasound sensors, machine-vision cameras, and sensor processing and autonomous driving decision-making software executed in a CPU/APU and a memory unit inside a specialized set-top box installed in the commercial vehicle.

The installation of such components may be completed as a before-market (i.e. factory spec) option at the time of the vehicle's initial manufacturing, or as an aftermarket add-on procedure at the trucking company's request. In the preferred embodiment of the invention, the in-vehicle autonomous driving module(s) in each vehicle is further connected to neural networks operated by external data centers, which in turn enable adaptive machine learning based on a plethora of vehicle sensor and decision-making datasets originating from a large number of commercial vehicles equipped with identical or similar autonomous driving electronic components and operating software.

Continuing with the holistic multi-component relationship diagram (100) as shown in FIG. 1, the in-vehicle autonomous driving modules implemented by the self-driving hardware and software module provider (105) in the trucking company's fleet of commercial vehicles (101) transmit at least a portion of their output data streams to the autonomous driving co-driver switch mode certification system provided by the autonomous driving co-driver switch mode certification system and ELD provider (103). The sharing of output data streams from the in-vehicle autonomous driving modules with the autonomous driving co-driver switch mode certification system can ensure that the autonomous driving is legally approved and certified for use during the commercial vehicle's operation, by requiring a specific set of conditions stipulated by the commercial trucking safety regulatory agency (107) to be fully satisfied before and during the engagement in the autonomous driving co-driver switch mode.

For example, the autonomous driving co-driver switch mode in a commercial vehicle may be subject to a tamperproof certification process, which ensures that machine-controlled autonomous driving is only activated and/or active, if the commercial vehicle is traveling through a regulatory agency-approved route and if the commercial vehicle is physically supervised by a regulatory agency-approved commercial vehicle driver. The tamperproof certification process in this instance involves checking machine readout values from autonomous driving software and/or hardware modules, in-vehicle sensors, OBD device outputs, and ELD outputs to ensure that the commercial vehicle driver is only engaging in autonomous driving under a specific set of regulation-approved driving conditions and routes. Furthermore, in order to activate and to remain in the autonomous driving co-driver switch mode, the commercial vehicle driver may also be required to stay awake and present in the driver's seat as a legally-responsible "co-driver" with overriding privileges in the commercial vehicle during the machine-controlled autonomous driving.

Moreover, in one embodiment of the invention, if the autonomous driving co-driver switch mode certification system receives output streams from the vehicle OBD device that indicate mechanical problems with the vehicle or unsafe speed, acceleration, braking, or steering patterns by the commercial driver prior to an activation request or an activation of the autonomous driving co-driver switch mode, the autonomous driving co-driver switch mode may be denied of certification. The denied certification may be automatically reported to the commercial vehicle safety and regulatory agency (107) in real time via a wireless transceiver installed in the commercial vehicle for regulatory compliance and/or violation alerts.

In an alternate embodiment of the invention, the autonomous driving co-driver switch mode may be designed to be activated in the commercial vehicle even without a preemptive certification process, but any violations against the specific set of regulation-approved driving conditions and routes may be reported to the commercial trucking safety regulatory agency (107) retroactively after a belated certification process. Such violations against the specific set of regulation-approved driving conditions and routes, while being engaged in the autonomous driving co-driver switch mode, may result in penalties or fines against the driver of the commercial vehicle and the trucking company (101).

Figure 2:
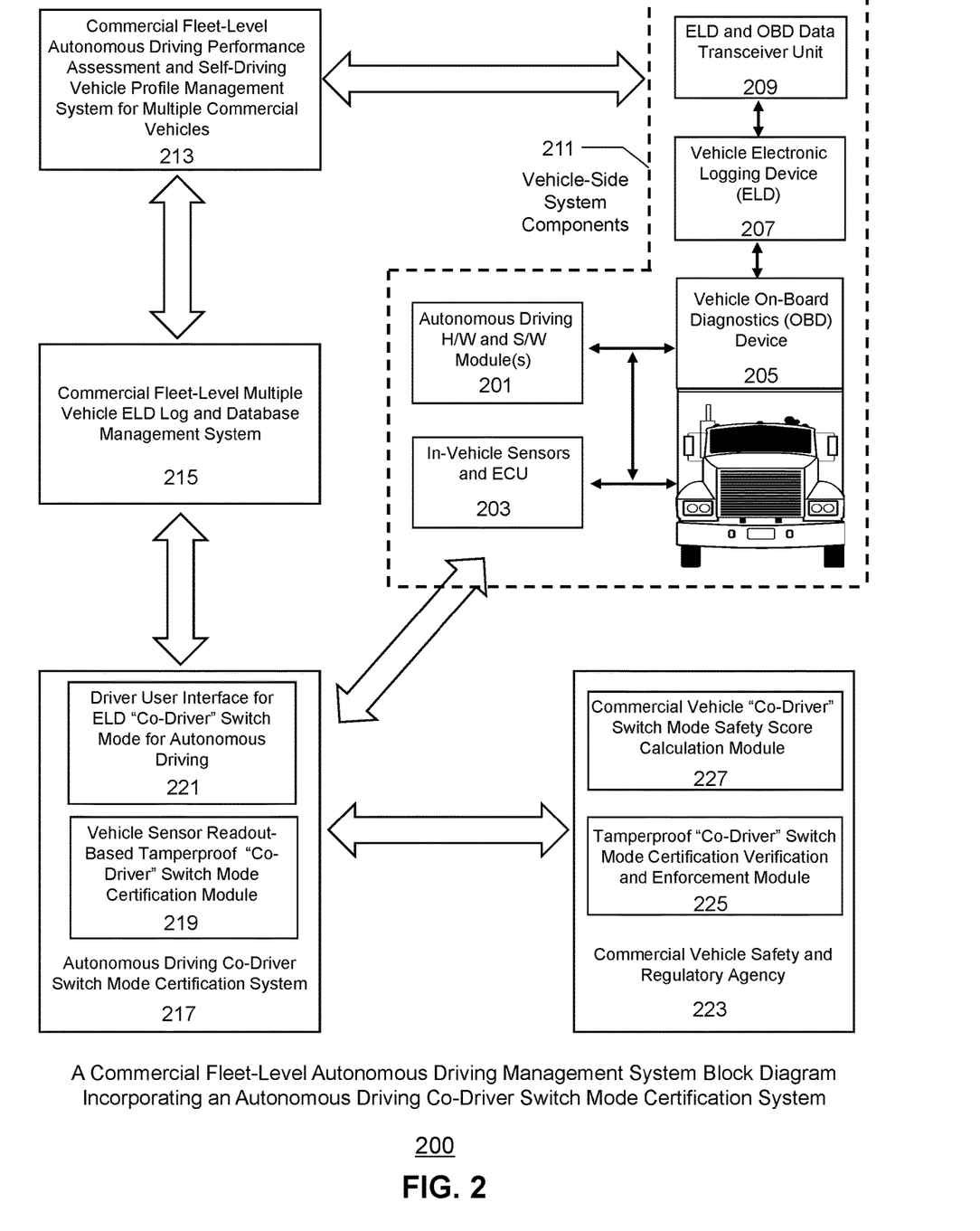
FIG. 2 shows a commercial fleet-level autonomous driving management system block diagram incorporating an autonomous driving co-driver switch mode certification system, in accordance with an embodiment of the invention.

FIG. 2 shows a commercial fleet-level autonomous driving management system block diagram (200) incorporating an autonomous driving co-driver switch mode certification system (217), in accordance with an embodiment of the invention. As shown in this block diagram (200), the autonomous driving co-driver switch mode certification system (217) comprises a driver user interface for ELD "co-driver" switch mode for autonomous driving (221) and a vehicle sensor readout-based tamperproof "co-driver" switch mode certification module (219), which are operatively connected to the rest of the commercial fleet-level autonomous driving management system, such as vehicle-side system components (211), a commercial fleet-level multiple vehicle ELD log and database management system (215), a commercial fleet-level autonomous driving performance assessment and self-driving vehicle profile management system for multiple commercial vehicles (213), and electronic components (225, 227) from a commercial vehicle safety and regulatory agency (223).

Figure 3:
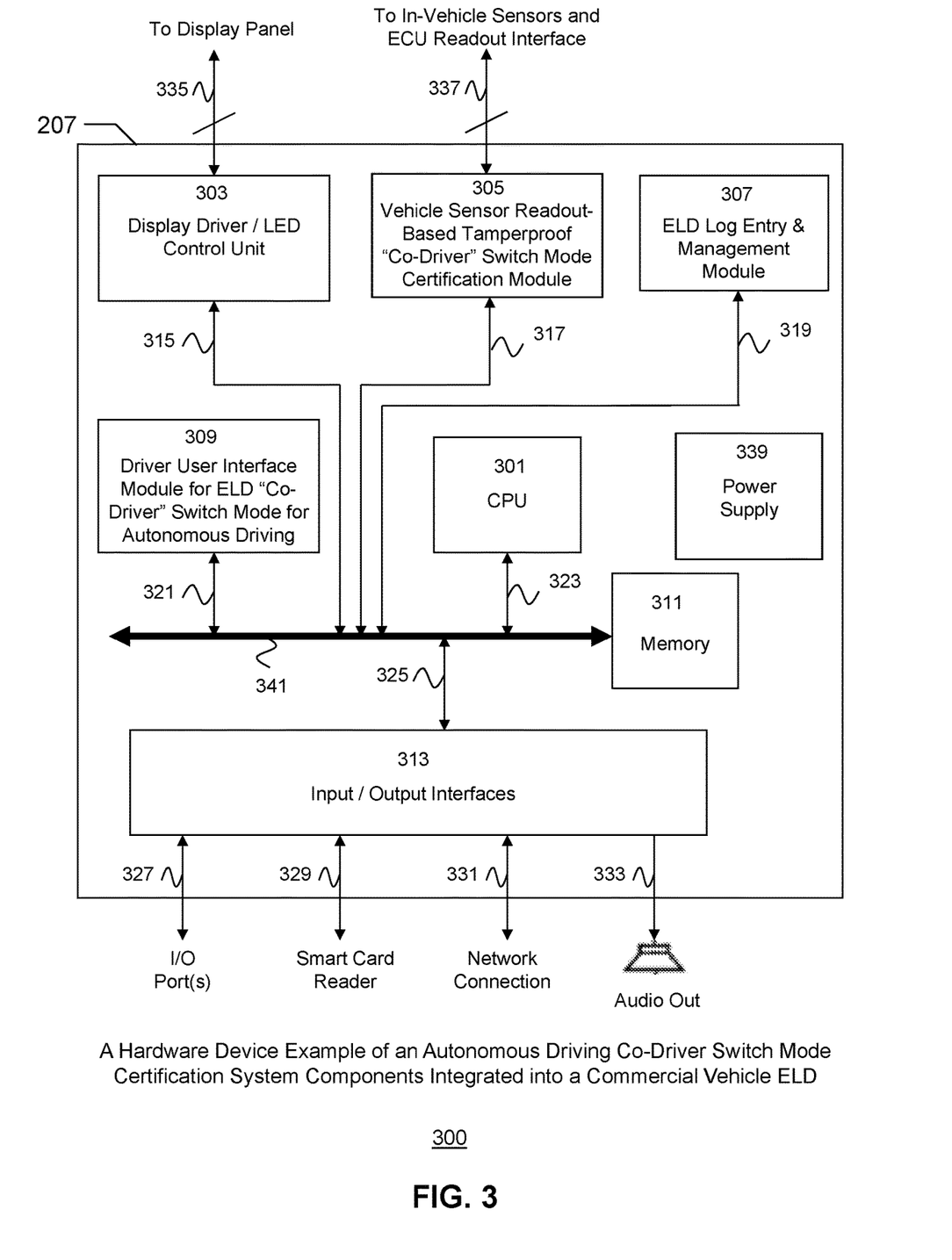
FIG. 3 shows a hardware device example of an autonomous driving co-driver switch mode certification system components integrated into a commercial vehicle electronic logging device (ELD), in accordance with an embodiment of the invention.

In the preferred embodiment of the invention, the driver user interface for ELD "co-driver" switch mode for autonomous driving (221) and the vehicle sensor readout-based tamperproof "co-driver" switch mode certification module (219) may be integrated into a specialized version of a vehicle electronic logging device (ELD) (207), as further illustrated in FIG. 3. In this case, the vehicle ELD (207) is capable of providing the driver user interface for the ELD co-driver switch mode on a display screen inside the commercial vehicle. In another embodiment of the invention, the driver user interface for ELD "co-driver" switch mode for autonomous driving (221) may be implemented as a mobile application or a personal computer (PC) application executed on a portable electronic device utilized by the commercial vehicle driver, while the vehicle sensor readout-based tamperproof "co-driver" switch mode certification module (219) is incorporated into the specialized version of the vehicle electronic logging device (ELD) (207), autonomous driving hardware and software modules (201), or another vehicle-side system component.

As shown in FIG. 2, in the preferred embodiment of the invention, the autonomous driving co-driver switch mode certification system (217) shares data output streams originating from various vehicle-side system components (211) in the commercial vehicle, such as the autonomous driving hardware and software modules (201), in-vehicle sensors and ECU (203), and a vehicle OBD device (205). As described previously, the term "autonomous driving" herein refers to full or partial machine-controlled vehicle driving performed by artificial intelligence (AI) that proactively engages in vehicle driving decisions without requiring a human driver to control the vehicle's steering wheel and pedals directly during the machine-controlled vehicle driving. Examples of machine-controlled vehicle driving decisions include, but are not limited to, steering, braking, accelerating, navigating through a defined route, and avoiding obstacles (e.g. other vehicles, cross traffic, pedestrians, objects) that compromise vehicle safety, when an autonomous driving mode is activated in the vehicle.

In this embodiment of the invention, the artificial intelligence (AI) for autonomous driving is provided by the autonomous driving hardware and software modules (201), which are operatively connected to the engine control unit (ECU) and in-vehicle sensors (203), such as LIDAR, cameras, ultrasound sensors, radar sensors, and GPS receivers. As shown in FIG. 2, the autonomous driving hardware and software modules (201) may further be connected to the commercial fleet-level autonomous driving performance assessment and self-driving vehicle profile management system for multiple commercial vehicles (213) that provides adaptive neural network or machine learning from an accumulation of a macro dataset (i.e. a "big data") originating from a plurality of vehicles engaged in autonomous driving modes.

The autonomous driving co-driver switch mode is configured to provide a comprehensive commercial trucking safety regulatory compliance with the commercial vehicle safety and regulatory agency (223), when the commercial driver of the commercial vehicle activates autonomous driving. In the preferred embodiment of the invention, the autonomous driving co-driver switch mode for enabling autonomous driving of the commercial vehicle is designed to be engaged only after a tamperproof certification process, which is executed by the vehicle sensor readout-based tamperproof co-driver switch mode certification module (219) as shown in FIG. 2. This uniquely-novel tamperproof certification process for the autonomous driving co-driver switch mode ensures that machine-controlled autonomous driving is only activated or stays active, when the commercial vehicle is traveling through a regulatory agency-approved route and when the commercial vehicle is physically supervised by a regulatory agency-approved commercial vehicle driver.

As shown in the commercial fleet-level autonomous driving management system block diagram (200) in FIG. 2, the tamperproof certification process typically involves checking machine readout values from the autonomous driving hardware and software modules (201), the in-vehicle sensors and ECU (203), the vehicle OBD device (205), and the vehicle ELD (207) to ensure that the commercial vehicle driver is only engaging in autonomous driving under a specific set of regulation-approved driving conditions and routes. Furthermore, in order to activate and to remain in the autonomous driving co-driver switch mode, the commercial vehicle driver may also be required to be awake and present in the driver's seat as a legally-responsible "co-driver" with overriding privileges in the commercial vehicle during the machine-controlled autonomous driving.

In the preferred embodiment of the invention, the autonomous driving hardware and software modules (201) is configured to transmit at least a portion of their output data streams to the autonomous driving co-driver switch mode certification system (217), which may be integrated into the vehicle ELD (207) or provided as a standalone set-top box internal or external to the commercial vehicle. The sharing of output data streams from the autonomous driving hardware and software modules (201) with the autonomous driving co-driver switch mode certification system (217) can ensure that the autonomous driving is legally approved and certified for use during the commercial vehicle's operation, by requiring a specific set of conditions stipulated by the commercial vehicle safety and regulatory agency (223) to be fully satisfied before and during the engagement in the autonomous driving co-driver switch mode.

Moreover, in one embodiment of the invention, if the autonomous driving co-driver switch mode certification system (217) receives output streams from the vehicle OBD device (205) that indicate mechanical problems with the vehicle or unsafe speed, acceleration, braking, or steering patterns by the commercial driver prior to an activation request or an activation of the autonomous driving co-driver switch mode, the autonomous driving co-driver switch mode may be denied of certification. The denied certification may be automatically reported to the commercial vehicle safety and regulatory agency (223) in real time via a wireless transceiver (209) installed in the commercial vehicle for regulatory compliance and/or violation alerts.

As shown in FIG. 2, the commercial vehicle safety and regulatory agency (223) incorporates a commercial vehicle co-driver switch mode safety score calculation module (227) that creates and maintains a quantitative metric and an evaluation scoring scale to quantify the safety level of a particular commercial vehicle or a particular commercial vehicle driver when the commercial vehicle co-driver switch mode is engaged for autonomous driving. The commercial vehicle co-driver switch mode safety score calculation module (227) may take account of the number of denied certification attempts for the particular commercial vehicle or the particular commercial vehicle driver in the autonomous driving co-driver switch mode certification system (217), real-time driving behavioral problems by the particular commercial vehicle driver, frequency of breakdowns or mechanical problems detected by the vehicle OBD device (205), vehicle's age and repair history, and vehicle driver disciplinary records.

In the preferred embodiment of the invention, the safety score is inversely proportional to the frequency of certification denials, driver behavior problems, and vehicle breakdown history. Therefore, a lower commercial vehicle co-driver switch mode safety score may indicate a lower level of "trustworthiness" for the particular commercial vehicle or the particular commercial vehicle driver, while a higher commercial vehicle co-driver switch mode safety score may indicate a higher level of "trustworthiness" for the particular commercial vehicle or the particular commercial vehicle driver, from the regulatory agency's evaluation perspective on commercial vehicle safety in autonomous driving modes. If the safety score for the particular commercial vehicle or the particular commercial vehicle driver falls below a threshold value for an acceptable level of safety for commercial vehicles in autonomous driving modes, the commercial vehicle safety and regulatory agency (223) may decide to temporarily or permanently prohibit the particular commercial vehicle or the particular commercial vehicle driver from activating the autonomous driving co-driver switch mode until the detected risk are satisfactorily resolved. In one embodiment of the invention, a tamperproof co-driver switch mode certification verification and enforcement module (225) operated by the commercial vehicle safety and regulatory agency (223) can electronically and remotely disable or revoke the particular commercial vehicle's autonomous driving capabilities, if the vehicle's autonomous driving co-driver switch mode safety score falls below the threshold value as defined or legally mandated by the commercial vehicle safety and regulatory agency (223).

Furthermore, in the embodiment of the invention as shown in FIG. 2, the commercial vehicle safety and regulatory agency (223) also incorporates the tamperproof co-driver switch mode certification verification and enforcement module (225) that makes certification approval or denial decisions based on input parameters provided by various vehicle-side system components (211) and the autonomous driving co-driver switch mode certification system (217). An approved certification may be automatically recorded, archived as a data entry associated with the particular commercial vehicle, and further validated by the tamperproof co-driver switch mode certification verification and enforcement module (225) executed by a computer server operated by the commercial vehicle safety and regulatory agency (223). Subsequently, the vehicle-side system components (211) and the autonomous driving co-driver switch mode certification system (217) are informed of the successful certification of the autonomous driving co-driver switch mode from the tamperproof co-driver switch mode certification verification and enforcement module (225).

On the other hand, if the autonomous driving co-driver switch mode certification is denied due to the detection of unapproved autonomous driving routes or anomalous output parameters from the in-vehicle sensors and ECU (203), the vehicle OBD device (205), or the autonomous driving hardware and software modules (201), the denied certification is also recorded and archived as a data entry associated with the particular commercial vehicle. Furthermore, the tamperproof co-driver switch mode certification verification and enforcement module (225) operated by the commercial vehicle safety and regulatory agency (223) may also take additional enforcement steps against the autonomous driving co-driver switch mode, which include actions such as electronically disabling the particular commercial vehicle from engaging in the autonomous driving co-driver switch mode and/or warning the associated commercial vehicle driver to avoid activating the autonomous driving co-driver switch mode, until safety concerns are resolved with the commercial vehicle safety and regulatory agency (223). As described previously, repeated instances of denied certifications may lower safety scores associated with the particular commercial vehicle and/or the particular commercial vehicle driver calculated and updated in real time by the commercial vehicle co-driver switch mode safety score calculation module (227).

In an alternate embodiment of the invention, the autonomous driving co-driver switch mode may be designed to be activated in the commercial vehicle even without a preemptive certification process, but any violations against the specific set of regulation-approved driving conditions and routes may be reported to the tamperproof co-driver switch mode certification verification and enforcement module (225) operated by the commercial vehicle safety and regulatory agency (223) retroactively after a belated certification process. Such violations against the specific set of regulation-approved driving conditions and routes, while being engaged in the autonomous driving co-driver switch mode, may result in penalties or fines against the driver and/or the trucking company associated with the commercial vehicle.

In addition, the commercial fleet-level autonomous driving management system block diagram (200) as shown in FIG. 2 also incorporates the commercial fleet-level multiple vehicle ELD log and database management system (215), which is configured to analyze, archive, and optimize a large amount of vehicle electronic logging device (ELD) data streams originating from a fleet of commercial vehicles, wherein the vehicle ELD data streams include electronic records of driving and resting activities and legal compliance records that are typically wirelessly transmitted to the commercial fleet-level multiple vehicle ELD log and database via ELD and OBD data transceiver units (209) in the fleet of commercial vehicles.

Furthermore, in this embodiment of the invention, the commercial fleet-level multiple vehicle ELD log and database management system (215) and the vehicle-side system components (211) from each commercial vehicle in the fleet are also operatively connected to the commercial fleet-level autonomous driving performance assessment and self-driving vehicle profile management system for multiple commercial vehicles (213), which is configured to store, evaluate, and store autonomous driving performance records that are electronically transmitted from the fleet of autonomous driving module-equipped commercial vehicles. Preferably, the commercial fleet-level autonomous driving performance assessment and self-driving vehicle profile management system for multiple commercial vehicles (213) operates as a neural network or a "big data" machine-learning platform, which is executed on a scalable number of computer servers to derive, revise, or fine-tune optimal safety-first machine-initiated decision making skills from thousands or millions of hours-worth of adaptive machine learning from autonomous driving-related data output parameters transmitted by the fleet of commercial vehicles via ELD and OBD data transceiver units in each vehicle.

The adaptive machine learning and the autonomous driving performance analysis performed by the commercial fleet-level autonomous driving performance assessment and self-driving vehicle profile management system for multiple commercial vehicles (213) can uniquely improve the overall safety and the operational efficiency of the commercial vehicle fleet when autonomous driving modes are engaged. For example, the adaptive machine learning from the fleet-level autonomous driving "big data" analysis performed by this system (213) may determine that the safest cruising speed in autonomous driving during rush hour traffic on a particular interstate highway is 10 miles below the posted speed limit, and that the least number of accidents occur if a commercial vehicle is utilizing the middle lane out of three one-way lanes in that particular interstate highway. Once the machine-initiated discovery from this adaptive machine learning is updated to the autonomous driving hardware and software modules (201) in each commercial vehicle in the fleet, a commercial vehicle from the fleet engaged in the autonomous driving co-driver switch mode on that particular interstate highway during the rush hour traffic automatically lowers the maximum cruising speed to 10 miles below the posted speed limit, while taking the middle lane position whenever deemed possible by the autonomous driving algorithms and the related in-vehicle sensors.

FIG. 3 shows a hardware device example (300) of an autonomous driving co-driver switch mode certification system components (e.g. 217, 219, 221 in FIG. 2) integrated into a vehicle electronic logging device (ELD) (207), in accordance with an embodiment of the invention. In this hardware device example (300) showing a system block diagram, the vehicle ELD (207) includes a CPU (301), a memory unit (311), a driver user interface module for ELD "co-driver" switch mode for autonomous driving (309), a vehicle sensor readout-based tamperproof "co-driver" switch mode certification module (305), an ELD log entry and management module (307), a display driver and/or LED control unit (303), input/output interfaces (313), and a power supply (339). Optionally, the vehicle ELD (207) also incorporates a global positioning system (GPS) receiver.

In one embodiment of the invention, the vehicle sensor readout-based tamperproof "co-driver" switch mode certification module (305) integrated in the vehicle ELD (207), as shown in FIG. 3, corresponds to the logical element "219" in FIG. 2. Likewise, the driver user interface module for ELD "co-driver" switch mode for autonomous driving (309) integrated in the vehicle ELD (207), as shown in FIG. 3, corresponds to the logical element "221" in FIG. 2. The vehicle sensor readout-based tamperproof "co-driver" switch mode certification module (305), the ELD log entry and management module (307), and the driver user interface module for ELD "co-driver" switch mode for autonomous driving (309) may be implemented as software codes stored in data storages, which are subsequently retrieved on-demand to be executed in the CPU (301) and the volatile memory unit (311) as needed. Alternatively, these modules (305, 307, 309) may be hard-coded into semiconductor chips as specialized hardware components within the vehicle ELD (207).

Furthermore, the vehicle ELD (207) may incorporate or be operatively connected to a wireless transceiver (e.g. 209) for ELD and OBD data communication with the commercial fleet-level multiple vehicle ELD log and database management system (215), the commercial fleet-level autonomous driving performance assessment and self-driving vehicle profile management system for multiple commercial vehicles (213), and electronic modules (225, 227) operated by the commercial vehicle safety and regulatory agency (223), as illustrated in FIG. 2. The wireless transceiver may be configured to transmit or receive data packets via a cellular network, a satellite network, a land-mobile radio network, or via another wireless communication method.

Continuing with FIG. 3, data storage units in the vehicle sensor readout-based tamperproof "co-driver" switch mode certification module (305) and the ELD log entry and management module (307) can store OBD data streams from a vehicle OBD device and any information entered by a vehicle driver or a commercial fleet operation personnel. Furthermore, these two modules (305, 307) executed in the vehicle ELD (207) can retrieve the OBD data streams, autonomous drive mode sensor readings associated with the vehicle, and autonomous driving co-driver switch mode certification records via an in-vehicle sensors and ECU readout interface (337). For example, vehicle speed, acceleration, engine on/off status, driver position/location sensing within the commercial vehicle during autonomous driving (e.g. driver's seat, passenger seat, sleeper cabin, outside the vehicle, etc.), and other vehicle OBD and sensor output parameters can be utilized by the vehicle sensor readout-based tamperproof "co-driver" switch mode certification module (305) and the ELD log entry and management module (307) to determine compliance to autonomous driving co-driver switch mode certification criteria, current status of specific driver activities, or commercial vehicle driver behavioral problems that can be reported to the fleet level management systems (e.g. 213, 215) and/or to the commercial vehicle safety and regulatory agency (223).

In the embodiment of the invention as shown in FIG. 3, the driver user interface module for ELD "co-driver" switch mode for autonomous driving (309) is configured to provide a driver user interface for the ELD co-driver switch mode on a display screen inside the commercial vehicle. In another embodiment of the invention, the driver user interface for ELD "co-driver" switch mode may be implemented as a mobile application or a personal computer (PC) application executed on a commercial vehicle driver's portable electronic device. Furthermore, as shown in FIG. 3, the vehicle sensor readout-based tamperproof "co-driver" switch mode certification module (305) is able to provide a comprehensive commercial trucking safety regulatory compliance with the commercial vehicle safety and regulatory agency by issuing or rejecting electronic certificates, when the commercial driver of the commercial vehicle activates or attempts to activate autonomous driving.

In the preferred embodiment of the invention, the autonomous driving co-driver switch mode for enabling autonomous driving of the commercial vehicle is designed to be engaged only after a tamperproof certification process, which is executed by the vehicle sensor readout-based tamperproof "co-driver" switch mode certification module (305) as shown in FIG. 3. This uniquely-novel tamperproof certification process for the autonomous driving co-driver switch mode ensures that the machine-controlled autonomous driving is only activated or stays active, when the commercial vehicle is traveling through a regulatory agency-approved route and when the commercial vehicle is physically supervised by a regulatory agency-approved commercial vehicle driver.

Typically, the tamperproof certification process involves checking machine readout values from the autonomous driving hardware and software modules (201 in FIG. 2), the in-vehicle sensors and ECU (e.g. 203 in FIG. 2), and the vehicle OBD device (e.g. 205 in FIG. 2) via the in-vehicle sensors and ECU readout interfaces to ensure that the commercial vehicle driver is only engaging in autonomous driving under a specific set of regulation-approved driving conditions and routes. Furthermore, in order to activate and to remain in the autonomous driving co-driver switch mode, the commercial vehicle driver may also be required to be awake and present in the driver's seat as a legally-responsible "co-driver" with overriding privileges in the commercial vehicle during the machine-controlled autonomous driving. In the preferred embodiment of the invention, a machine-initiated and successful tamperproof certification for the autonomous driving co-driver switch mode serves as a legal proof that the autonomous driving a commercial vehicle is currently engaged in is trustworthy and is fully compliant to pertinent commercial vehicle safety regulations.

Furthermore, the vehicle ELD (207) may also generate alerts or indicate log entry or autonomous driving co-driver switch mode certification statuses via a plurality of LED indicator lights connected to the display driver and/or LED control unit (303) and a display driver output (335). Moreover, various hardware components (i.e. 301, 303, 305, 307, 309, 311, 313, 339) of the vehicle ELD (207) can transmit and receive data among each other via an internal bus (341) and various electrical connections (315, 317, 319, 321, 323, 325).

In the embodiment of the invention as shown in FIG. 3, the vehicle ELD (207) also includes the power supply unit (339), which supplies electrical power to various hardware components (i.e. 301, 303, 305, 307, 309, 311, 313) in the hardware system blocks of the vehicle ELD. Furthermore, the vehicle ELD (207) may also include the input/output interfaces (313) that can accommodate data communication for I/O ports (327), smart card readers (329), network connections (331), and an audio out connection (333) to a speaker. As shown in the hardware device example (300) of the vehicle ELD (207), the input/output interfaces (313) are operatively connected to the internal bus (341), which can communicate with any other components in the vehicle ELD.

Figure 4:
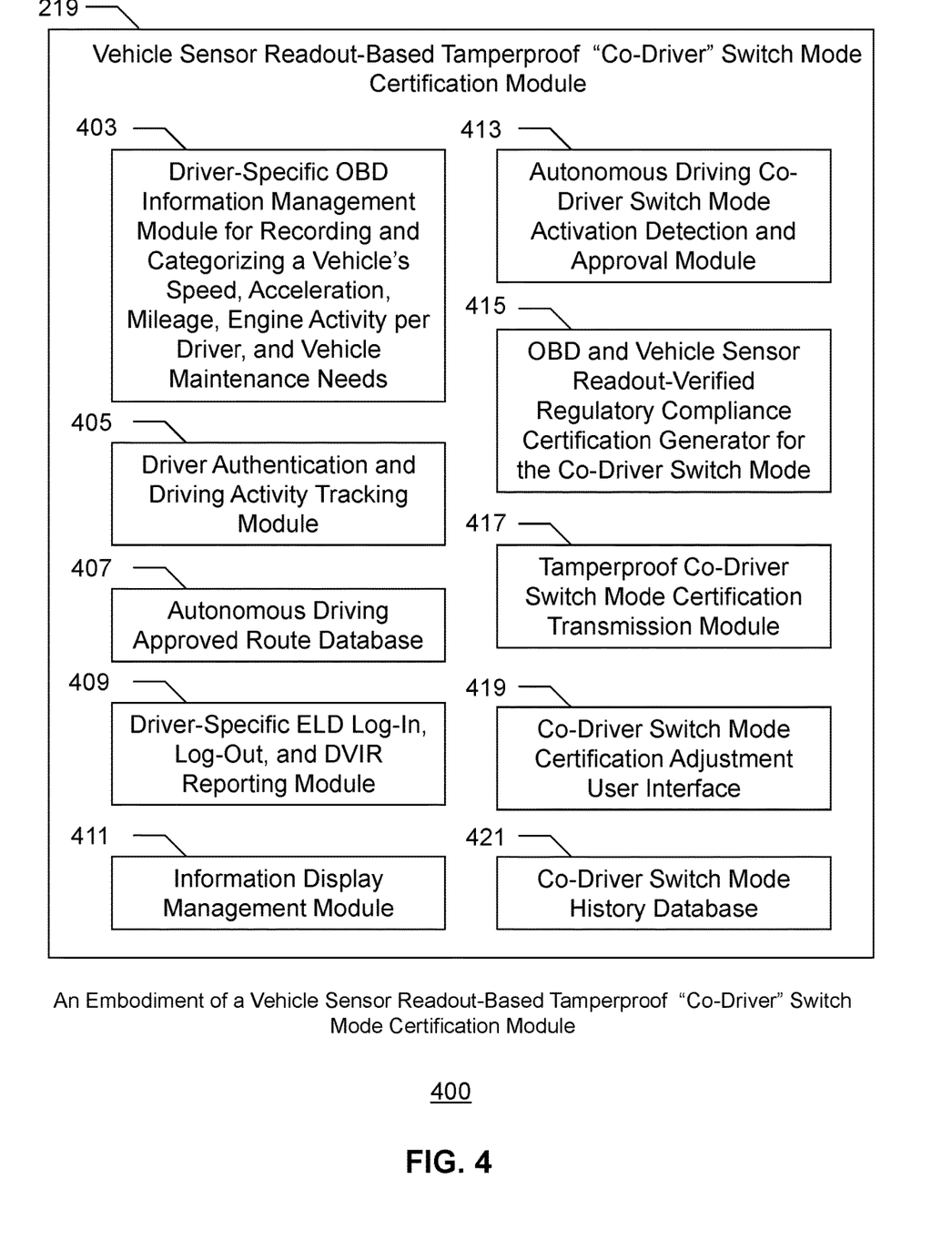
FIG. 4 shows an embodiment of a vehicle sensor readout-based tamperproof "co-driver" switch mode certification module, in accordance with an embodiment of the invention.

FIG. 4 shows an embodiment (400) of the vehicle sensor readout-based tamperproof "co-driver" switch mode certification module (219), in accordance with an embodiment of the invention. In a preferred embodiment of the invention, the vehicle sensor readout-based tamperproof "co-driver" switch mode certification module (219) shown in FIG. 4 corresponds to the same element (219) in FIG. 2. The vehicle sensor readout-based tamperproof "co-driver" switch mode certification module (219) may be integrated into a vehicle electronic logging device (ELD), as previously shown in FIG. 3 as element 305. The vehicle ELD is a vehicle-installed specialized hardware device that connects to a vehicle OBD device and an ELD/OBD data transceiver unit, and in this configuration, manages and stores vehicle and driver ELD logs while also managing autonomous driving co-driver switch mode certification decisions. In another embodiment of the invention, the vehicle sensor readout-based tamperproof "co-driver" switch mode certification module (219) may be a standalone hardware unit or a software module executed on a portable electronic device or a computer server.

In the preferred embodiment of the invention, the vehicle sensor readout-based tamperproof "co-driver" switch mode certification module (219) comprises a driver-specific OBD information management module (403) for recording and categorizing a vehicle's speed, acceleration, mileage, engine activity, OBD fault codes, and vehicle repair/maintenance-related output parameters per driver. An OBD data stream which contains vehicular dynamics, engine on/off statuses, OBD fault codes (if any), and fuel consumption information can be stored, categorized, and extracted in the driver-specific OBD information management module (403).

The vehicle sensor readout-based tamperproof "co-driver" switch mode certification module (219) also includes a driver authentication and driving activity tracking module (405), which is configured to validate the identity of the driver in a commercial vehicle by inquiring passwords, biometric signatures, facial recognition, or electronic identifiers to complete the driver authentication. Typically, the driver authentication is a necessary step for the co-driver switch mode certification, because it serves as a baseline for additionally determining trustworthiness of the driver for allowing autonomous driving of the commercial vehicle. Furthermore, the driver authentication and driving activity tracking module (405) is also configured to accumulate the driver's driving activities, which are recorded as ELD logs or other records.

For instance, the driver's vehicle access duration may be inferred by the driver authentication timing with the vehicle ELD, speedometer readings, and engine on/off statuses that suggest the particular driver's on-duty driving activities or resting periods. The driver authentication and driving activity tracking module (405) is also capable of determining and tracking the driver's resting periods based on machine-generated vehicle data parameters, such as motion sensor values in the sleeper cabin, driver authentication timing with the vehicle ELD, speedometer readings, engine on/off statuses, and driver operation schedule entries. In addition, the driver's resting periods can be tracked more accurately if the driver's expected resting schedules are uploaded to the driver authentication and driving activity tracking module (405).

In addition, the vehicle sensor readout-based tamperproof "co-driver" switch mode certification module (219) also includes an autonomous driving approved route database (407), which stores and dynamically updates the commercial vehicle safety and regulatory agency-approved routes, such as interstate freeways, state highways, and/or residential roads that are specifically approved for commercial vehicle autonomous driving under an approved set of vehicle operating conditions. Preferably, this autonomous driving approved route database (407) is linked to the Global Positioning System (GPS) and the commercial vehicle's navigation system to indicate, update, and display the agency-approved routes in real time, with computer graphics map color-coding, visual cues, or audio alerts. In the preferred embodiment of the invention, a successful co-driver switch mode certification requires the commercial vehicle to be presently on one of the agency-approved routes for autonomous driving. The certification is designed to be rejected if the commercial vehicle is presently not on one of the agency-approved routes for autonomous driving.

Continuing with FIG. 4, the vehicle sensor readout-based tamperproof "co-driver" switch mode certification module (219) also incorporates a driver-specific ELD log-in, log-out, and driver vehicle inspection report (DVIR) reporting module (409), which is capable of initiating (i.e. "logging in"), terminating (i.e. "logging out" or signing off), and/or transferring (i.e. "handover") a driver-specific ELD or DVIR log generation privileges in the vehicle ELD. A plurality of drivers who may time-share a commercial vehicle can utilize one or more portable electronic devices and corresponding remote ELD log handover mobile applications to request, grant, or deny a driver-specific ELD log handover for the vehicle ELD installed in the commercial vehicle, even when a particular driver has forgotten to log out of the vehicle ELD after his or her allotted driving operation period and is no longer near the time-shared commercial vehicle.

Moreover, the vehicle sensor readout-based tamperproof "co-driver" switch mode certification module (219) also incorporates an autonomous driving co-driver switch mode activation detection and approval module (413) that detects whether the autonomous driving co-driver switch mode is attempted to be activated or activated by press of a button, a voice command, or another method of invoking the autonomous driving co-driver switch mode by the commercial vehicle driver. Once the attempted activation or the actual activation is detected, the autonomous driving co-driver switch mode activation detection and approval module (413) is configured to determine whether the current set of conditions (e.g. being on an autonomous driving-approved route, recent driver behaviors, recent compliance to driver resting or other safety requirements, and mechanical functionality of the commercial vehicle) based on vehicle sensor readouts merit a real-time regulatory approval of the autonomous driving co-driver switch mode, which allows the commercial vehicle driver to merely take a supervisory role to autonomous machine driving for an extensive period.

If the current set of conditions merits the real-time regulatory approval from the autonomous driving co-driver switch mode activation detection and approval module (413), then an electronic certificate that approves the autonomous driving co-driver switch mode is generated by an OBD and vehicle sensor readout-verified regulatory compliance certification generator for the co-driver switch mode (415), as shown in FIG. 4. This electronic certificate is then wirelessly transmitted from the commercial vehicle to the tamperproof "co-driver" switch mode certification verification and enforcement module (225) in the commercial vehicle safety and regulatory agency (223) via a tamperproof co-driver switch mode certification transmission module (417). In the preferred embodiment, the tamperproof co-driver switch mode certification transmission module (417) either embeds a cellular transceiver or is operatively connected to the ELD and OBD data transceiver unit (209) to enable remote data communication. In some cases, the tamperproof "co-driver" switch mode certification verification and enforcement module (225) in the commercial vehicle safety and regulatory agency (223) may retrieve vehicle and driver safety records stored in the agency database to additionally validate the trustworthiness of the transmitted electronic certificate.

If the current set of conditions does not merit a regulatory approval, then the autonomous driving co-driver switch mode activation detection and approval module (413) informs the OBD and vehicle sensor readout-verified regulatory compliance certification generator for the co-driver switch mode (415) to not issue the electronic certificate. Furthermore, the autonomous driving co-driver switch mode activation detection and approval module (413) also notifies the non-issuance of the electronic certificate to the tamperproof "co-driver" switch mode certification verification and enforcement module (225) in the commercial vehicle safety and regulatory agency (223).

The vehicle sensor readout-based tamperproof "co-driver" switch mode certification module (219) as shown in FIG. 4 further includes a co-driver switch mode certification adjustment user interface (419), which allows an authorized personnel to modify the current set of conditions required for the successful issuance of the electronic certificate for engaging in the autonomous driving co-driver switch mode. For example, threshold levels or definition of "safe" driving behaviors for a particular commercial driver may be adjusted dynamically, depending on varying restrictions of individual municipal, state, or national jurisdictions. The dynamic adjustment of such threshold levels or definitions of "safe" driving behaviors subsequently impact certification likelihood for the particular commercial driver.

For instance, the particular commercial driver may be considered to exhibit "safe" driving behaviors if speeding violations or rest requirement violations did not occur in the last thirty days in a first jurisdiction, while in a second jurisdiction, the same "safe" driving behaviors need to be shown in the entirety of the last three months, which makes the safety behavior threshold more stringent in the second jurisdiction than in the first jurisdiction. Failure to meet these driver behavior requirements may trigger non-certification and non-approval of the autonomous driving co-driver switch mode. The co-driver switch mode certification adjustment user interface (419) can be displayed by an in-vehicle infotainment system or a display panel connected to the commercial fleet-level autonomous driving performance assessment and self-driving vehicle profile management system (213) or the commercial fleet-level multiple vehicle ELD log and database management system (215).

Furthermore, the vehicle sensor readout-based tamperproof "co-driver" switch mode certification module (219) as shown in FIG. 4 also includes a co-driver switch mode history database (421), which is configured to store and retrieve historical digital records for the autonomous driving co-driver switch mode activations and deactivations categorized by vehicles or drivers. The historical digital records stored in the co-driver switch mode history database (421) can be subsequently utilized by the commercial vehicle safety and regulatory agency (223) to calculate commercial vehicle "co-driver" switch mode safety scores and to determine enforcement actions (e.g. mailing official safety warning letters to a fleet operator, vehicle license suspension, driver license suspension, fleet operation license revocation, etc.), if any unsafe behaviors or track records by a particular commercial driver or a particular commercial vehicle trigger necessary enforcement actions to preserve public safety.

In addition, the vehicle sensor readout-based tamperproof "co-driver" switch mode certification module (219) also includes an information display management module (411). The information display management module (411) is configured to display, highlight, and modify autonomous driving co-driver switch mode certificates, conditions for certificate issuances or rejections, historical records for past certificates, violation alerts, safety alerts, driving activity statuses, and other information pertinent to the autonomous driving co-driver switch mode certification system. Furthermore, any graphical and textual information associated with the vehicle ELD may also be displayed by the autonomous driving co-driver switch mode certification system.

In one embodiment of the invention, various modules (403, 405, 407, 409, 411, 413, 415, 417, 419, 421) contained inside the vehicle sensor readout-based tamperproof "co-driver" switch mode certification module (219) may be software elements that are executed in a CPU/APU or a memory unit of a hardware device, such as system block components (e.g. 305 of FIG. 3) of a vehicle electronic logging device (ELD). In another embodiment of the invention, the vehicle sensor readout-based tamperproof "co-driver" switch mode certification module (219) may be a combination of software elements and hardware elements that conceptually constitute various components (403, 405, 407, 409, 411, 413, 415, 417, 419, 421) in the vehicle sensor readout-based tamperproof "co-driver" switch mode certification module (219). Yet in another embodiment of the invention, the vehicle sensor readout-based tamperproof "co-driver" switch mode certification module (219) may be entirely implemented into a semiconductor chip, which makes the vehicle sensor readout-based tamperproof "co-driver" switch mode certification module (219) a system-on-chip (SoC) hardware solution.

Figure 5:
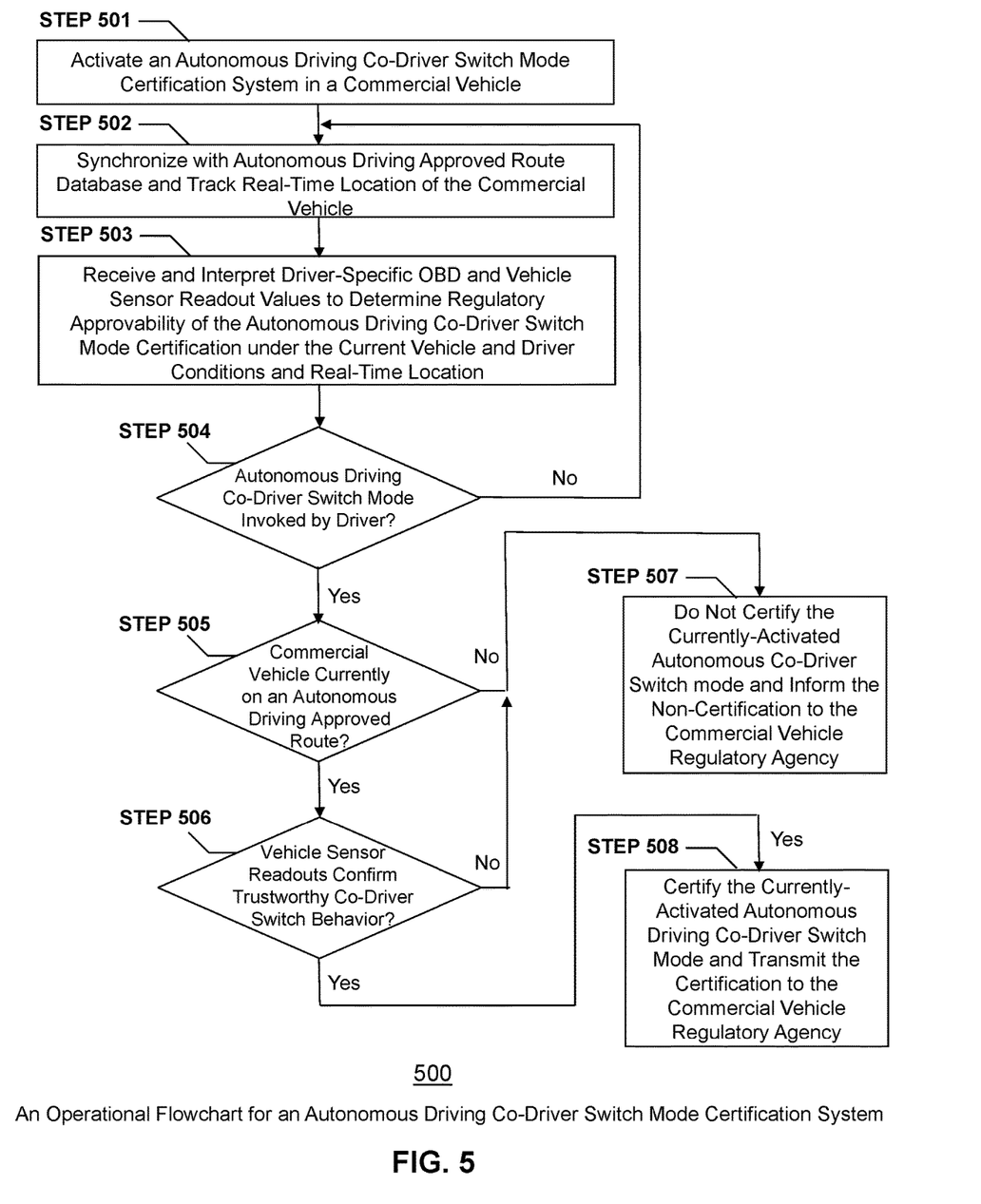
FIG. 5 shows an operational flowchart for an autonomous driving co-driver switch mode certification system, in accordance with an embodiment of the invention.

FIG. 5 shows an operational flowchart (500) for an autonomous driving co-driver switch mode certification system, in accordance with an embodiment of the invention. The first step in operating the autonomous driving co-driver switch mode certification system is activating an autonomous driving co-driver switch mode certification system in a commercial vehicle, as shown in STEP 501. Preferably, the activation of this certification system may be a default startup sequence in a vehicle ELD or in an infotainment system designed for the commercial vehicle. Alternatively, the certification system may be manually activated by pressing a button on the vehicle ELD, issuing a voice command, or starting a mobile app for the certification system on the commercial driver's portable device.

Then, the autonomous driving co-driver switch mode certification system synchronizes with an autonomous driving approved route database and start tracking real-time location of the commercial vehicle, as shown in STEP 502. Subsequently, the autonomous driving co-driver switch mode certification system starts receiving and interpreting driver-specific OBD and vehicle sensor readout values to determine regulatory approvability of the autonomous driving co-driver switch mode certifications under the current vehicle and driver conditions and real-time location, as shown in STEP 503. Then, as illustrated in STEP 504, if the autonomous driving co-driver switch mode is invoked by the commercial driver by pressing a dashboard button, issuing a voice command, or pushing an autonomous driving co-driver switch mode start button in a mobile application, the autonomous driving co-driver switch mode certification system checks whether the commercial vehicle is currently on an autonomous driving approved route, as shown in STEP 505. If the commercial vehicle is not on an approved route, then the autonomous driving co-driver switch mode certification system does not certify the currently-activated autonomous co-driver switch mode and inform the non-certification to the commercial vehicle regulatory agency, as shown in STEP 507.

On the other hand, if the commercial vehicle is on an approved route, the autonomous driving co-driver switch mode certification system checks whether the vehicle sensor readouts confirm trustworthy co-driver switch behavior, as shown in STEP 506. Examples of "trustworthy" co-driver switch behavior include, but are not limited to, not getting into accidents recently, complying to legal speed and traffic regulations, meeting driver rest requirements for commercial transport, not triggering safety-related OBD fault codes due to vehicle component malfunctions, and maintaining vehicle engines and brakes regularly over the agency-defined period (e.g. per week, per month, per quarter, per calendar year, etc.).

If the autonomous driving co-driver switch mode certification system determines that the vehicle sensor readouts indeed confirm the trustworthiness of the commercial driver and the commercial vehicle that are invoking the autonomous driving co-driver switch mode, then the system certifies the currently-activated autonomous driving co-driver switch mode and transmit the electronic certification to the commercial vehicle regulatory agency, as shown in STEP 508. On the other hand, if the autonomous driving co-driver switch mode certification system determines that the vehicle sensor readouts do not confirm the trustworthiness of the commercial driver and the commercial vehicle that are invoking the autonomous driving co-driver switch mode, then the system rejects certification of the currently-activated autonomous co-driver switch mode and inform the non-certification to the commercial vehicle regulatory agency, as shown in STEP 507.

In one embodiment of the invention, the non-certification of the commercial vehicle that attempted to engage in the autonomous driving co-driver switch mode prevents or reverses activation of the autonomous driving mode in the commercial vehicle, thus necessitating the commercial driver to stay on a manual human driving mode, without relying on the autonomous driving mode. In another embodiment of the invention, the non-certification of the commercial vehicle may still allow the commercial vehicle and the corresponding driver to continue with the currently-engaged autonomous driving mode, but lowers the commercial vehicle "co-driver" switch mode safety score for that particular vehicle and the corresponding driver. The lowering of the safety score for the particular vehicle and the corresponding driver may prevent future activations of autonomous driving modes, especially if additional non-certifications occur in the near future periods defined by the system (e.g. daily, weekly, monthly, quarterly, etc.).

Various embodiments of the present invention provide several key advantages in uniquely ensuring commercial vehicle safety in autonomous driving modes. One advantage of an embodiment of the present invention is providing a novel autonomous driving co-driver switch mode certification system for a commercial vehicle that securely determines and certifies an autonomous machine driving mode activated in a particular route under conditions approved by a regulatory agency, which in turn improves the trustworthiness and the overall safety of commercial trucking transportation that utilizes autonomous driving modes.

Furthermore, another advantage of an embodiment of the present invention is ensuring that this novel electronic system is objectively deemed trustworthy and tamperproof by incorporating real-time machine readout evidence from vehicle sensors, engine control unit (ECU) outputs, and/or electronic logging devices (ELDs).

In addition, another advantage of an embodiment of the present invention is providing a method for operating the novel autonomous driving co-driver switch mode certification system for a commercial vehicle that securely determines and certifies an autonomous machine driving mode activated in a particular route under conditions approved by a regulatory agency.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An autonomous driving co-driver switch mode certification system comprising:
    a vehicle electronic logging device (ELD) connected to a vehicle on-board diagnostics (OBD) device, in-vehicle sensors, and an engine control unit (ECU), wherein the vehicle ELD contains a CPU, a memory unit, and input and output interfaces;
    a vehicle sensor readout-based tamperproof co-driver switch mode certification module inside or operatively connected to the vehicle ELD that makes a machine determination of authenticity, safety, and trustworthiness of a commercial vehicle and a vehicle driver to approve or reject the commercial vehicle's engagement into an autonomous driving co-driver switch mode, wherein the vehicle sensor readout-based tamperproof co-driver switch mode certification module provides, applies, and enforces more lenient driver rest period and driver rest interval criteria in a re-certification of the autonomous driving co-driver switch mode compared to a first-time certification of the autonomous driving co-driver switch mode during a current trip, whenever the vehicle driver already utilized the autonomous driving co-driver switch mode during the current trip to take a supervisory role to autonomous machine driving, and wherein the vehicle sensor readout-based tamperproof co-driver switch mode certification module intelligently evaluates driver resting period regulatory compliance, autonomous driving eligibility at the commercial vehicle's current position, recent driving behaviors in human driving modes, and identity of the vehicle driver from in-vehicle sensor readout values, OBD data streams, and driver-specific electronic log information to generate a regulatory compliance certificate or a certification rejection, which is then transmitted to a commercial vehicle safety regulatory agency from the commercial vehicle; and
    an electronic log device (ELD) log entry and management module inside or operatively connected to the vehicle ELD, wherein the ELD log entry and management module generates the driver-specific electronic log information that contains a currently logged-in driver's on-duty, off-duty, and resting activities associated with the vehicle.

2. The autonomous driving co-driver switch mode certification system of claim 1, further comprising a driver user interface module executed by the vehicle ELD or another electronic device to adjust user preferences and options for certificate generation and driving modes.

3. The autonomous driving co-driver switch mode certification system of claim 1, further comprising an autonomous driving hardware or software module installed in the commercial vehicle and operatively connected to the vehicle ELD, wherein the autonomous driving hardware or software module is configured to perform autonomous machine driving when the autonomous driving co-driver switch mode is approved by the commercial vehicle safety regulatory agency and engaged under a constant supervision of the vehicle driver.

4. The autonomous driving co-driver switch mode certification system of claim 1, wherein the vehicle on-board diagnostics (OBD) device is connected to the engine control unit (ECU) and the in-vehicle sensors to record, diagnose, and generate an engine on or off status, vehicle speed data, acceleration and deceleration data, ambient air temperature data, and OBD fault codes as an OBD data stream.

5. The autonomous driving co-driver switch mode certification system of claim 1, wherein the vehicle sensor readout-based tamperproof co-driver switch mode certification module comprises a driver authentication and driving activity tracking module, an autonomous driving approved route database, an autonomous driving co-driver switch mode activation detection and approval module, and an OBD and vehicle sensor readout-verified regulatory compliance certification generator for the autonomous driving co-driver switch mode.

6. The autonomous driving co-driver switch mode certification system of claim 5, wherein the vehicle sensor readout-based tamperproof co-driver switch mode certification module further comprises a tamperproof co-driver switch mode certification transmission module, a co-driver switch mode certification adjustment user interface, and a co-driver switch mode history database.

7. The autonomous driving co-driver switch mode certification system of claim 6, wherein the vehicle sensor readout-based tamperproof co-driver switch mode certification module further comprises a driver-specific ELD log-in, log-out, and driver vehicle inspection report (DVIR) reporting module and a driver-specific OBD information management module for recording and categorizing a vehicle's speed, acceleration, mileage, engine activity per driver, and vehicle maintenance needs.

8. The autonomous driving co-driver switch mode certification system of claim 1, wherein the in-vehicle sensors are at least one of lidars, radars, cameras, ultrasound, and global positioning system (GPS) location sensors.

9. The autonomous driving co-driver switch mode certification system of claim 1, further comprising an ELD and OBD data transceiver connected to the vehicle ELD, wherein the ELD and OBD data transceiver is configured to transmit regulatory compliance certificates, certification rejection data, autonomous driving-related data, and ELD and OBD data to a commercial fleet-level autonomous driving performance assessment and self-driving vehicle profile management system for multiple commercial vehicles, a commercial fleet-level multiple vehicle ELD log and database management system, and the commercial vehicle safety regulatory agency.

10. The autonomous driving co-driver switch mode certification system of claim 1, wherein the commercial vehicle safety regulatory agency includes a commercial vehicle co-driver switch mode safety score calculation module executed on a computer server to derive a quantitative safety score for a particular commercial vehicle and a driver of the particular commercial vehicle when the autonomous driving co-driver switch mode is engaged for driver-supervised autonomous driving on a route electronically approved in real time by the commercial vehicle safety regulatory agency.

11. The autonomous driving co-driver switch mode certification system of claim 1, wherein the commercial vehicle safety regulatory agency includes a tamperproof co-driver switch mode certification verification and enforcement module, which is configured to approve, reject, or revoke the regulatory compliance certificate based on additional real-time regulatory compliance criteria set by the commercial vehicle safety regulatory agency.

12. The autonomous driving co-driver switch mode certification system of claim 1, wherein the certification rejection by the vehicle sensor readout-based tamperproof co-driver switch mode certification module blocks or cancels activation of the autonomous driving co-driver switch mode, which in turn disables autonomous machine driving in the commercial vehicle.

\* \* \* \* \*